E. C. CAPPER.
DEVICE FOR PARAFFINING VESSELS.
APPLICATION FILED MAR. 13, 1908.
899,511.
Patented Sept. 29, 1908.
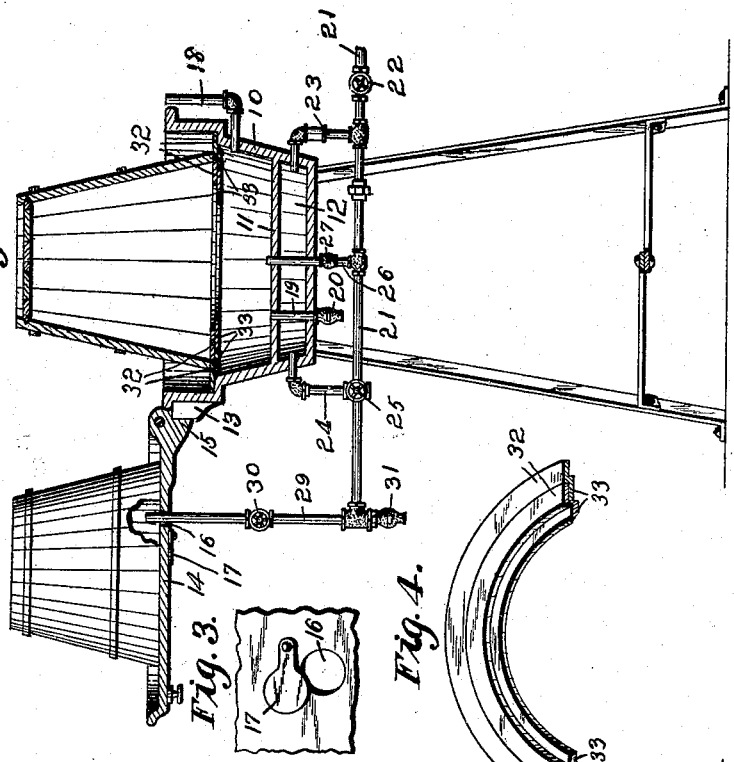
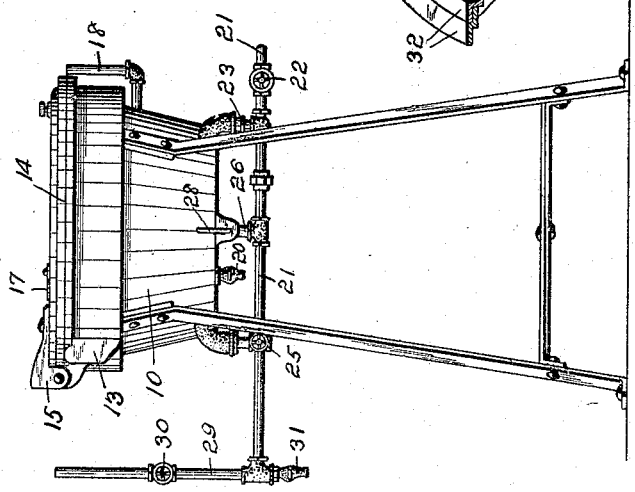
Witnesses.
F. C. Dahlberg.
F. C. Caswell
Inventor:
E. C. Capper.
by Orwig & Lane Atty's

UNITED STATES PATENT OFFICE.

EDWARD C. CAPPER, OF ALPHA, IOWA.

DEVICE FOR PARAFFINING VESSELS.

No. 899,511.          Specification of Letters Patent.          Patented Sept. 29, 1908.

Application filed March 13, 1908. Serial No. 420,939.

*To all whom it may concern:*

Be it known that I, EDWARD C. CAPPER, a citizen of the United States, residing at Alpha, in the county of Fayette and State of Iowa, have invented a new and useful Device for Paraffining Vessels, of which the following is a specification.

The object of my invention is to provide a device of simple, durable and inexpensive construction, designed to contain a quantity of paraffin, which paraffin may be maintained in a melted condition by means of steam or hot air, and which may be sprayed by the steam or hot air, over an inverted vessel resting on a support above the melted paraffin, and a further object is to provide improved and simplified means for heating the vessel to be coated with paraffin, prior to its being placed in position over the paraffin vessel, so that when the paraffin is sprayed on it, the coating of paraffin that will adhere to the vessel will be thin and evenly distributed.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of a device embodying my invention, with the cover in its closed position. Fig. 2 shows a vertical central sectional view of same, with the cover in its open position, and with the vessel to be coated placed on top of the paraffin receptacle. Fig. 3 shows a detail view illustrating a portion of the cover with the steam pipe opening therein, and the pivoted cap for covering said opening, and Fig. 4 shows a detail perspective view illustrating the detachable vessel supporting collars.

Referring to the accompanying drawings, I have used the reference numeral 10 to indicate the paraffin receptacle. This is preferably cast complete in one piece of metal, and is tapered from its upper toward its lower end, and is provided with a horizontal partition 11 spaced apart from the bottom of the receptacle to form a heating chamber 12. At one side of the vessel near its top, are the lugs 13, and hinged to the vessel adjacent to the lugs is a cover 14. Said cover is provided with lugs 15 so arranged that when the cover is swung open to a substantially horizontal position, the lugs 15 and 13 will engage and support the cover in a substantially horizontal position. The said cover is provided with an opening 16 and with a pivoted cap 17 adjacent to the opening, whereby the opening may be closed when desired. A vent pipe 18 extends from the interior of the paraffin receptacle to a point of discharge.

It is intended that the paraffin or other substance to be used in coating vessels, shall be placed on top of the partition 11, and melted by means of steam or hot air admitted below the partition. In order to provide for withdrawing the melted paraffin from the paraffin receptacle, I provide a pipe 19 extending through the partition 11 and the bottom of the paraffining receptacle, and provided with a valve 20 at its lower end.

In order to provide for heating the paraffin receptacle, and for spraying the melted paraffin and also for heating the vessel on top of the open cover, I employ a pipe 21 through which steam or hot air may be forced under pressure. A cut-off valve 22 is provided in said pipe, and a branch 23 connects with the pipe 21, and discharges into the chamber 12.

In order to provide for the escape of steam from the chamber 12, I employ a pipe 24 communicating with the chamber, and leading to a point of discharge, and provided with a valve 25, whereby the passage-way through the pipe 24 may be closed.

For spraying the paraffin, I have provided a branch pipe 26 communicating with the pipe 21 and extending up through the bottom of the vessel and through the partition 11, to a point a slight distance above said partition. A valve 27 is provided in said pipe controlled by a rod 28 extended outwardly beyond the bottom of the vessel, where it may be conveniently grasped by the operator.

I provide for heating a vessel resting on top of the cover when open, as follows: The numeral 29 indicates a branch pipe communicating with the pipe 21, and extending upwardly and designed to pass through the opening 16 in the cover, when the cover is in its open position, as clearly shown in Fig. 1. This branch pipe is provided with a valve 30, and at the bottom of the branch pipe 29 is a pet-cock 31 through which water of condensation may be drawn off.

In order to adapt the paraffining device to fit vessels of various sizes, I have provided a series of vessel supporting collars. Each collar comprises an annular rim 32 and a second annular rim 33 below the first and extending inwardly. The outer collar is of such size that the annular rim 32 will rest on a shoulder near the top of the paraffining receptacle, as shown in Fig. 2, and the vessel to be coated with paraffin is then placed on top of the annular rim 32. A number of collars of various sizes are provided, and so arranged that the annular rim 32 of one collar may rest on the annular rim 33 of another, as shown in Fig. 4 in such a manner as to provide a level surface on the top of all of the collars to receive vessels to be coated, so that vessels of any size may be accommodated.

In practical use, I first place a quantity of paraffin in the paraffining receptacle. I then open the valve 22 and permit steam to enter the chamber 12. The air within the chamber may be drawn off through the pipe 24. The heat in the chamber 12 will cause the paraffin to be melted. The cover is placed in an open position, and an inverted vessel is placed thereon, as shown in Fig. 2, then the valve 30 is opened, and steam is admitted into the vessel to heat it. Then the heated vessel is placed upon one of the collars on top of the paraffining vessel, and the valve 27 is then opened, so that the steam under pressure will blow up through the paraffining and cause it to be sprayed over the interior of the vessel to be paraffined. The steam escapes through the pipe 18.

When the spraying has continued long enough to properly coat the vessel, the valve 27 is closed and the vessel removed. Obviously, one vessel may be heated upon the cover while the other is being coated over the paraffining receptacle, so that an operator may quickly and easily heat and paraffin a large number of vessels. The melted paraffin may be if desired, withdrawn through the pipe 19.

When not in use, the cover may be closed over the paraffining receptacle, as shown in Fig. 1, and the cap 17 placed over the opening 16 so as to exclude dust from the interior of the paraffining receptacle.

I do not desire to be understood as limiting myself to the use of paraffin as the coating material nor to the use of steam as the heating material, as it is obvious that any suitable coating material may be used on a device of this kind, and any suitable heating medium may be employed instead of steam.

Having thus described my invention, what I claim and desire to secure by Letters Patent of the United States, is—

1. In a device of the class described, the combination of an open topped receptacle, a partition spaced apart from the bottom of the receptacle, said vessel above the partition being designed to contain melted paraffin or the like, means for introducing a heating medium into the space between the partition and the bottom of the receptacle, means for supporting an inverted vessel at the top of the receptacle and above that portion of the receptacle designed to contain the paraffin, and a pipe extending upwardly through the partition to a point a slight distance above it, a valve in said pipe, and means for supplying a heating medium under pressure to the pipe.

2. In a device of the class described, the combination of an open topped receptacle, a partition in the receptacle spaced apart from the bottom, the receptacle above the partition being designed to contain paraffin or the like, a pipe designed to carry a heating medium under pressure, a branch pipe connected therewith and communicating with the space between the partition and the bottom of the receptacle, a second pipe communicating with the space between the partition and the bottom of the receptacle and leading to a point of discharge, a valve therein, means for supporting an inverted vessel at the top of the receptacle above the space for the paraffin, a branch pipe communicating with the first mentioned pipe and extended upwardly through the partition, a valve therein, and a branch pipe communicating with the space above the partition and leading to a point of discharge, and a valve therein.

3. In a device of the class described, the combination of an open topped receptacle, a cover hinged to the receptacle, means for supporting the cover in a substantially horizontal position at one side of the receptacle, said cover being provided with an opening and a pipe for supplying the heating medium, said pipe being so positioned that when the cover is in its open position, the pipe will project through the opening.

4. In a device of the class described, the combination of an open topped receptacle, a partition arranged above the bottom of the receptacle to form a steam chamber between the partition and the bottom of the receptacle, a steam pipe, a valve therein, a branch connected with the steam pipe to discharge into the said steam chamber, an exhaust pipe leading from the steam chamber, a valve therein, a branch pipe connected with the steam pipe and extended upwardly through the bottom of the receptacle, and through the partition, a valve therein, a pipe extending through the partition and through the bottom of the receptacle, a valve at its lower end, a branch pipe connected with the steam pipe and extended upwardly at one side of the receptacle, a valve therein, a pet-cock at the lower end of said branch pipe for drawing off water of condensation, a cover hinged to one side of the vessel and having an opening therein, said cover in one position being extended over the receptacle, and in its other position being extended horizontally outward with the last mentioned branch pipe projected upwardly through the opening in the cover, and a cap pivoted to the cover adjacent to the opening therein.

Des Moines, Iowa, Feb. 18, 1908.

EDWARD C. CAPPER.

Witnesses:
 AUGUST HILMER,
 M. E. GEISER.